(12) United States Patent
Song

(10) Patent No.: US 7,867,667 B2
(45) Date of Patent: Jan. 11, 2011

(54) POLYMER ELECTROLYTE FOR A FUEL CELL, A METHOD OF PRODUCING THE SAME, AND A FUEL CELL SYSTEM COMPRISING THE SAME

(75) Inventor: Min-Kyu Song, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1230 days.

(21) Appl. No.: 11/478,397

(22) Filed: Jun. 28, 2006

(65) Prior Publication Data
US 2006/0292414 A1    Dec. 28, 2006

(30) Foreign Application Priority Data
Jun. 28, 2005    (KR) .................. 10-2005-0056246

(51) Int. Cl.
*H01M 8/10* (2006.01)
(52) U.S. Cl. ............... 429/479; 429/491; 429/483; 429/492; 429/493; 429/494
(58) Field of Classification Search ............ 429/30, 429/479, 33, 491, 483, 492, 493, 494; 427/115
See application file for complete search history.

(56) References Cited

U.S. PATENT DOCUMENTS 4,585,581 A * 4/1986 Skotheim .............. 252/519.21

2003/0001143 A1    1/2003  Akita et al.
2006/0251951 A1    11/2006 Obata et al.

FOREIGN PATENT DOCUMENTS

| CN | 1427027 A | 7/2003 |
|---|---|---|
| CN | 1531127 A | 9/2004 |
| JP | 02-068861 | 3/1990 |
| JP | 2001-081220 | 3/2001 |
| JP | 2001-158806 | 6/2001 |
| JP | 2001-160398 | 6/2001 |
| JP | 2001-160407 | 6/2001 |
| JP | 2003-203642 | 7/2003 |
| JP | 2003-242997 | 8/2003 |
| KR | 10-2004-0072082 | 8/2004 |
| KR | 10-2004-0092024 | 11/2004 |
| KR | 10-2005-0117583 | 12/2005 |

OTHER PUBLICATIONS

Japanese Office action dated Jan. 12, 2010, for corresponding Japanese application 2006-178666, noting listed references in this IDS.

(Continued)

*Primary Examiner*—Laura S Weiner
(74) *Attorney, Agent, or Firm*—Christie, Parker & Hale, LLP

(57) ABSTRACT

A polymer electrolyte membrane for a fuel cell includes an ion exchange resin membrane, and an electric conductive polymer. The electric conductive polymer is present along a thickness direction of the ion exchange resin membrane from one side of the ion exchange resin membrane to the interior of the ion exchange resin membrane.

18 Claims, 9 Drawing Sheets

OTHER PUBLICATIONS

Patent Abstracts of Japan, Publication No. 2001-158806; Date of Publication: Jun. 12, 2001; in the name of Koji Akita et al.
Patent Abstracts of Japan, Publication No. 2001-160398; Date of Publication: Jun. 12, 2001; in the name of Naohiro Tsumura.
Patent Abstracts of Japan, Publication No. 2001-160407; Date of Publication: Jun. 12, 2001; in the name of Koji Akita et al.
Korean Patent Abstracts, Publication No. 1020040092024 A; Date of Publication Nov. 3, 2004; in the name of Byeong Chan Bae, et al.
Chinese Patent Gazette, dated Jun. 9, 2010, for corresponding Chinese Patent application 200610106106.5, noting listed references in this IDS.

* cited by examiner

POLYMER ELECTROLYTE FOR A FUEL CELL, A METHOD OF PRODUCING THE SAME, AND A FUEL CELL SYSTEM COMPRISING THE SAME

CROSS-REFERENCE TO RELATED APPLICATION

This application claims priority to and the benefit of Korean Patent Application No. 10-2005-0056246, filed in the Korean Intellectual Property Office on Jun. 28, 2005, the entire content of which is incorporated herein by reference.

FIELD OF THE INVENTION

The present invention relates to a polymer electrolyte membrane for a fuel cell, a method of making the same, and a fuel cell system including the same. More particularly, the present invention relates to a polymer electrolyte membrane for a fuel cell that can efficiently reduce or prevent cross-over of a fuel, a method of making the same, and a fuel cell system including the same.

BACKGROUND OF THE INVENTION

A fuel cell is a power generation system for producing electrical energy through an electrochemical redox reaction of an oxidant and a fuel, such as hydrogen or a hydrocarbon-based material, such as methanol, ethanol, natural gas, or the like.

Representative examples of fuel cells include a polymer electrolyte membrane fuel cell (PEMFC) and a direct oxidation fuel cell (DOFC). The direct oxidation fuel cell includes a direct methanol fuel cell which uses methanol as a fuel.

A polymer electrolyte membrane fuel cell (PEMFC) has a high energy density, but requires a fuel reforming processor for reforming methane, methanol, natural gas, or the like, in order to produce a hydrogen-rich gas as the fuel gas.

By contrast, a direct oxidation, fuel cell (DOFC) has an energy density that is lower than the polymer electrolyte membrane fuel cell, but does not need a fuel reforming processor.

A fuel cell includes a stack that generates electricity. The stack includes several unit cells stacked in a multi-layer fashion. Each of the unit cells is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) with a polymer electrolyte membrane between them.

In one embodiment, a fuel is supplied to an anode and is reacted with a catalyst associated with the anode, and the fuel is oxidized to produce protons and electrons. The electrons are transferred into a cathode via an out-circuit, and the protons are transferred into the cathode through a polymer electrolyte membrane. An oxidant is also supplied to the cathode, and the oxidant, protons, and electrons are reacted on a catalyst at the cathode to produce electricity along with water.

The polymer electrolyte membrane is used to transfer the protons from the anode to the cathode during the cell operation. In addition, the polymer electrolyte membrane is used to electrically insulate the anode from the cathode, and is also used to separate a reacting gas or liquid.

A polymer electrolyte membrane should have high electrochemical stability and low ohmic loss at a high current density. In addition, the polymer electrolyte should have good separation capability of a reacting gas or liquid during the cell operation, and have strong mechanical properties and dimensional stability to form a stack.

SUMMARY OF THE INVENTION

An aspect of the present invention provides a polymer electrolyte membrane for a fuel cell that efficiently prevents cross-over of a fuel.

Another aspect of the present invention provides a method for making a polymer electrolyte membrane for a fuel cell which improves cell performance characteristics.

Another aspect of the present invention provides a fuel cell system that includes the above polymer electrolyte membrane.

According to an embodiment of the present invention, a polymer electrolyte membrane for a fuel cell is provided. The polymer electrolyte membrane includes an ion exchange resin membrane and an electric conductive polymer. The electric conductive polymer is present from one side of the ion exchange resin membrane to the interior of the ion exchange resin membrane.

According to another embodiment of the present invention, a method for making a polymer electrolyte membrane is provided. The method includes: disposing a mixture of a monomer of an electric conductive polymer and an organic acid dopant solution on one side of an ion exchange resin membrane; disposing an oxidant solution on the other side of the ion exchange resin membrane; diffusing the mixture and the oxidant solution into the ion exchange resin membrane; and polymerizing the monomer in the exchange resin membrane.

According to yet another embodiment of the present invention, a fuel cell system is provided. The fuel cell system includes: a) an electricity generation unit having i) at least one membrane-electrode assembly which includes a polymer electrolyte membrane interposed between a cathode and an anode, and ii) a separator arranged on each side of the membrane-electrode assembly; b) a fuel supplier; and c) an oxidant supplier. The polymer electrolyte membrane includes an ion exchange resin membrane and an electric conductive polymer. The electric conductive polymer is present from one side of the ion exchange resin membrane to the interior of the ion exchange resin membrane. The one side of the ion exchange resin membrane contacts the anode.

DETAILED DESCRIPTION

One embodiment of the present invention provides a polymer electrolyte membrane for a fuel cell.

A polymer electrolyte membrane may be formed using a perfluorosulfonic acid resin membrane having good conductivity, mechanical properties, and chemical resistance. The thicker the perfluorosulfonic acid resin membrane, the better its dimensional stability and mechanical properties, but its membrane resistance also increases. By contrast, the thinner a perfluorosulfonic acid resin membrane is, the lower its membrane resistance, but the thinner perfluorosulfonic acid resin membrane may allow a hydrocarbon fuel, such as methanol, to cross-over the membrane to result in a loss of fuel during operation to thereby lower the performance of the fuel cell.

A polymer electrolyte membrane in accordance with one embodiment of the present invention can reduce or prevent the cross-over of a fuel. In one embodiment, a polymer electrolyte membrane in accordance with an embodiment of the present invention may be fabricated as follows.

Figure 1:
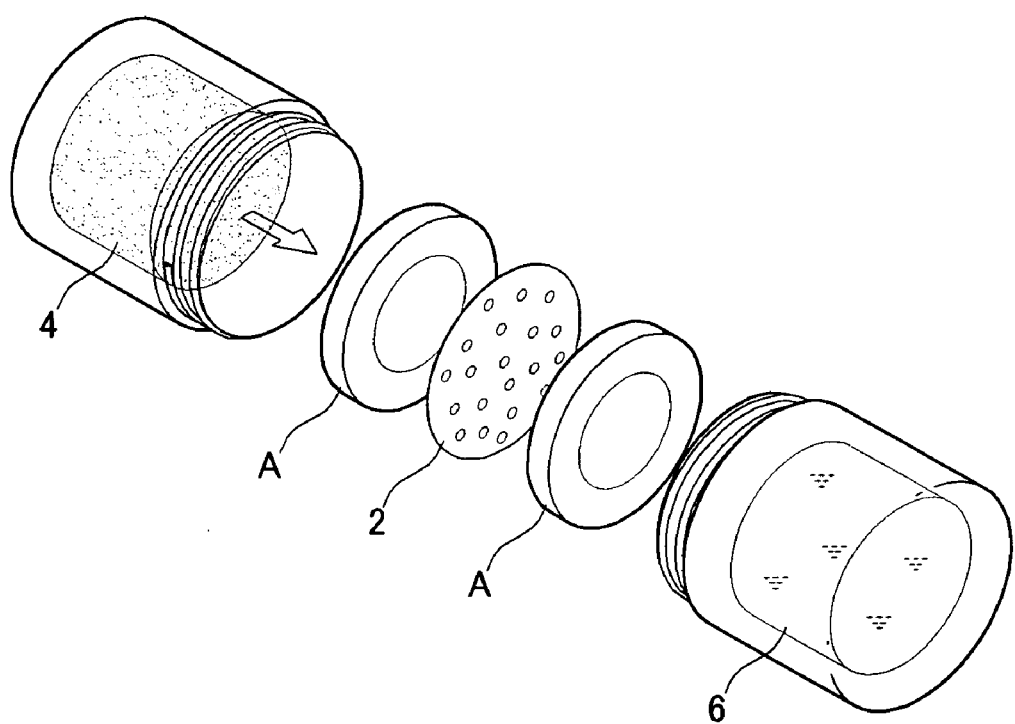
FIG. 1 is a schematic view showing equipment for making a polymer electrolyte membrane in accordance with an embodiment of the present invention.

First, a mixture of a monomer of an electric conductive polymer and an organic acid dopant solution is disposed at one side of an ion exchange resin membrane, which is generally used as the polymer electrolyte membrane, and an oxidant solution is disposed at the other side of the ion exchange resin membrane. For example, as shown in FIG. 1, an ion exchange resin membrane 2 is positioned in the middle of a 2-compartment diffusion cell. Also, a monomer of an electric conductive polymer-organic acid dopant solution mixture 4 is disposed at one side of the ion exchange resin membrane 2, and an oxidant solution 6 is disposed at the other side of the ion exchange resin membrane. In FIG. 1, O-rings A are used to seal a case to prevent the mixture 4 and the oxidant solution 6 from leaking.

Non-limiting examples of the monomer of the electric conductive polymer include at least one material selected from the group consisting of aniline, pyrrole, acetylene, acene, thiophene, alkylthiophene, p-phenylene, phenylene, phenylene sulfide, vinylene phenylene, furan, and mixtures thereof.

Non-limiting examples of the organic acid dopant include at least one material selected from the group consisting of sulfuric acid, phosphoric acid, camphorsulfonic acid, benzenesulfonic acid, sodium benzenesulfonate, alkylbenzenesulfonic acid, alkylsodium benzenesulfonate, and mixtures thereof. In one embodiment, the dopant is selected from alkylbenzenesulfonic acid, alkylsodium benzenesulfonate, and mixtures thereof, and the alkyl group has from 1 to 12 carbons. In another embodiment, the dopant is selected from alkylbenzenesulfonic acid, alkylsodium benzenesulfonate, and mixtures thereof, and the alkyl group has from 8 to 12 carbons.

In addition, the organic acid dopant solution may include a solvent such as deionized water, acetonitrile, dimethylsulfoxide, dimethylformamide, and chloroform. The organic acid dopant solution can have a concentration ranging from about 0.5 M to 1.5 M, depending on the use.

Non-limiting examples of the oxidant include ammonium persulfate, ferric perchlorate, ferric chloride, ferric nitrate, ammonium ferric sulfate, benzoyl peroxide, potassium persulfate, and so on.

The monomer of the electric conductive polymer and the oxidant can be mixed in a mole ratio ranging from 1:1 to 1:15. In addition, the monomer and the dopant can, in one embodiment, be mixed in a mole ratio ranging from 4:1 to 1:2.

The concentration of the dopant and the oxidant should not be too high or too low, because this may cause the electric conductive polymer to be too thin or too thick, which upset the balance between the hydrocarbon fuel barrier function of the polymer and the proton conductivity function of the polymer.

The oxidant solution may include a solvent such as deionized water, acetonitrile, dimethylsulfoxide, dimethylformamide, chloroform, and so on.

The ion exchange resin membrane includes any suitable polymer resin which can be used as a polymer electrolyte membrane. A typical polymer resin includes a cation exchange group at its side chain. The cation exchange group may be selected from the group consisting of a sulfonic acid group, a carboxylic acid group, a phosphoric acid group, a phosphonic acid group, and derivatives thereof. According to one embodiment of the present invention, the ion exchange resin membrane has an ion exchange ratio ranging from 3 to 33 and an equivalent weight (EW) ranging from 700 to 2000. The ion exchange ratio of the ion exchange resin membrane is determined by the number of carbons in the polymer backbone and the number of cation exchange groups. The ion-exchange ratio ranging from 3 to 33 corresponds to an equivalent weight ranging from 700 to 2000.

Non-limiting examples of the polymer resin include at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer includes at least one material selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole),and poly(2,5-benzimidazole). However, the ion exchange polymer is not limited thereto.

Here, when the ion exchange resin membrane is at least 10 μm thick, it can reduce or prevent the cross-over of a hydrocarbon fuel such as methanol, while accomplishing resistance reduction effects.

The mixture of the monomer and organic acid dopant solution (also referred to as the mixture) and the oxidant solution are diffused at different diffusion speeds into opposite sides of the ion exchange resin membrane. The mixture and the oxidant solution then encounter each other in the ion exchange resin membrane. In more detail, since the oxidant solution is diffused faster than the mixture, they encounter each other near the mixture side of the ion exchange resin membrane, leading to a radical polymerization reaction by the oxidant.

As a result, a porous electric conductive polymer forms at the hydrophilic domain of the ion exchange resin membrane from a side thereof to the interior of the ion exchange resin membrane, but this porous conductive polymer does not exist at the other side of the ion exchange resin membrane. The electric conductive polymer may be polyaniline, polypyrrole, polyacetylene, polyacene, polythiophene, polyalkylthiophene, poly(p-phenylene), polyphenylene, polyphenylene sulfide, polyphenylenevinylene, or polyfuran, depending on the kind of the monomer used.

Figure 2:
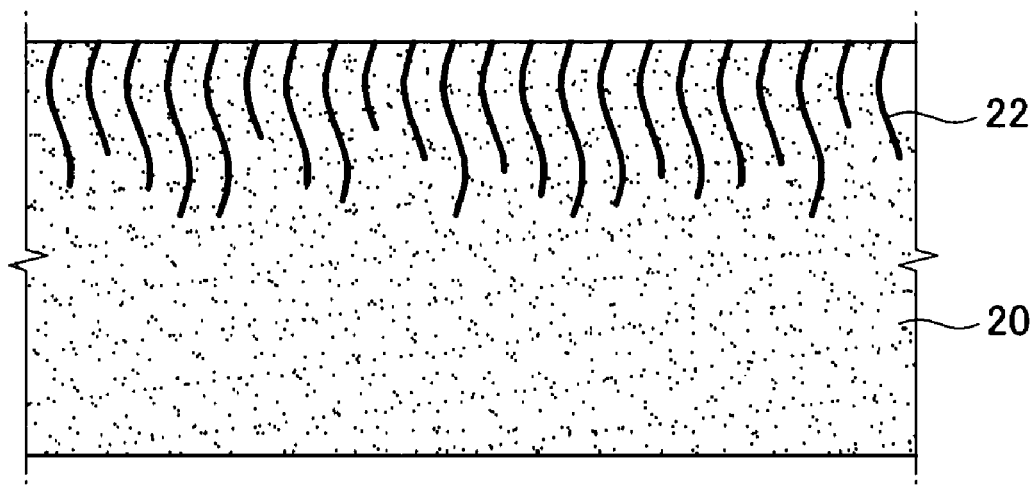
FIG. 2 is a schematic view showing a polymer electrolyte membrane in accordance with an embodiment of the present invention.

As shown in FIG. 2, a polymer electrolyte membrane 200 for a fuel cell prepared according to the above fabrication process includes an ion exchange resin membrane 20 with an electric conductive polymer 22. The electric conductive polymer 22 is shown to exist from one side of the ion exchange resin membrane 20 to the interior of the ion exchange resin membrane 20. In one embodiment, from the one side of the ion exchange resin membrane 20, the electric conductive polymer 22 is present in the ion exchange resin membrane 20 up to 20% of the entire thickness of the ion exchange resin membrane 20. According to one embodiment, the electric conductive polymer 22 is present up to a range from 2 to 10% of the entire thickness of the membrane 20.

A dopant may be doped onto the electric conductive polymer 22. Non-limiting examples of the dopant include sulfuric acid, phosphoric acid, camphorsulfonic acid, alkylbenzenesulfonic acid, and alkylsodium benzenesulfonate.

Here, since an electric conductive polymer in one embodiment of the present invention is formed from a side of an ion exchange resin membrane to a predetermined depth in the ion exchange resin membrane, the polymer can be used to reduce or prevent a hydrocarbon fuel, which is generally moving along the hydrophilic domain of the ion exchange resin membrane, from being diffused through the membrane. Therefore, in order to maximize such an effect, one embodiment of the present invention positions the side of the polymer electrolyte membrane formed with one or more electric conductive polymers in the polymer electrolyte membrane on the anode side of a membrane-electrode assembly.

The electric conductive polymer should not exist throughout the entire ion exchange resin membrane from one side to the other side, as this may cause a short-circuit in a fuel cell.

The electric conductive polymer can coexist with another polymer. Non-limiting examples of the other polymer include at least one generally know polymer selected from the group consisting of poly(ethylene oxide), poly(vinyl pyridine), poly (sodium acrylate), poly(ethylene glycol), poly(ethylene glycol diacrylate), poly(ethylene glycol dimethacrylate), poly (sodium isobylene malate), poly(ethyl oxazoline), poly (amide), poly(oxyethylene propylene), poly(styrene sulfonic acid), and mixtures thereof.

The other polymer is added to a mixture of a monomer of an electric conductive polymer and an organic acid dopant, and it can exist in a mixed state with the electric conductive polymer.

In addition, a monomer of the other polymer can be added to a mixture of a monomer of an electric conductive polymer and an organic acid dopant to thereby exist as a copolymer of the electric conductive polymer and the other polymer.

If the other polymer is used with the electric conductive polymer together, it can effectively prevent fuel cross-over. In one embodiment, the electric conductive polymer and the other polymer are in a weight ratio of 7/3 to 5/5 when they exist as a mixture or a copolymer. The two polymers may effectively prevent fuel cross-over within the above ratio.

A fuel cell system including a polymer electrolyte membrane in accordance with one embodiment of the present invention includes at least one electricity generating element, a fuel supplier, and an oxidant supplier.

The electricity generating element includes a membrane-electrode assembly which includes the polymer electrolyte membrane. A cathode and an anode are positioned at both sides of the polymer electrolyte membrane with separators positioned at both sides of the membrane-electrode assembly. The electricity generating element generates electricity through oxidation of fuel and reduction of an oxidant.

As described above, the polymer electrolyte membrane of the present invention is positioned such that the side having an electric conductive polymer contacts the anode to reduce or prevent a cross-over phenomenon in which a hydrocarbon fuel such as methanol supplied to the anode passes through the polymer electrolyte membrane and moves to the cathode.

The fuel supplier supplies the electricity generating element with a fuel including hydrogen, and the oxidant supplier supplies the electricity generating element with an oxidant such as oxygen or air. The fuel includes liquid or gaseous hydrogen, or a hydrocarbon-based fuel such as methanol, ethanol, propanol, butanol, or natural gas.

Figure 3:
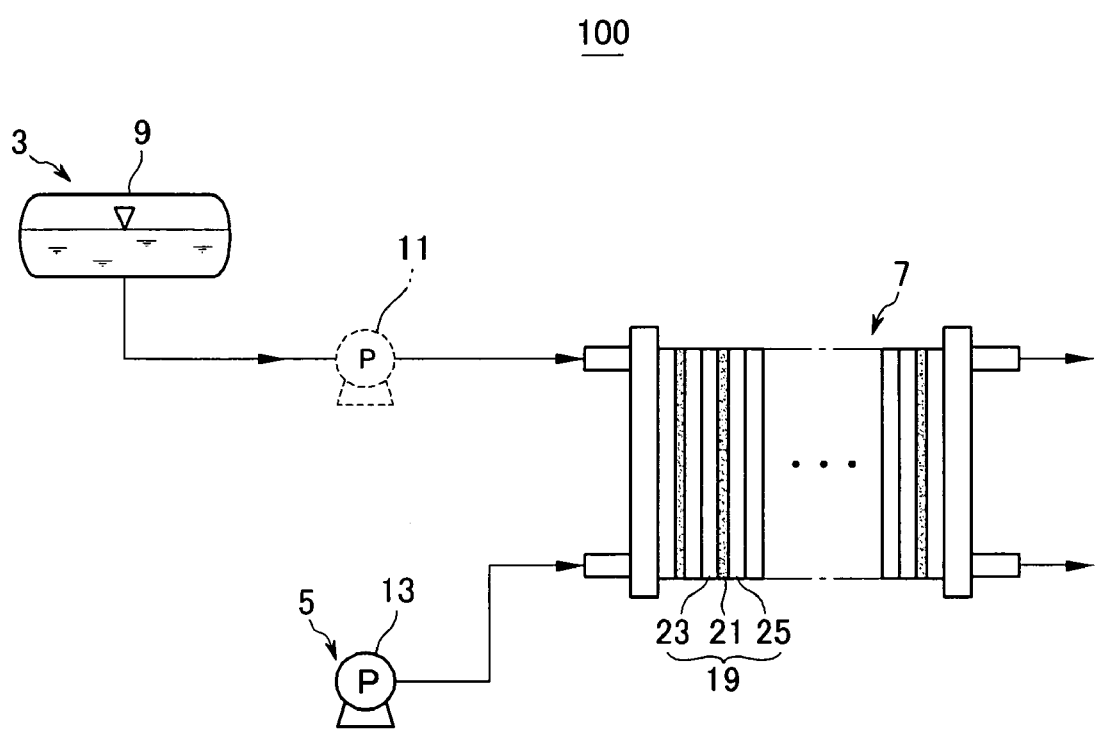
FIG. 3 is a schematic view showing a fuel cell system according to one embodiment of the present invention.

FIG. 3 shows a schematic structure of a fuel cell system 100 according to one embodiment of the present invention. In the fuel cell system 100 of FIG. 3, a fuel and an oxidant are provided to an electricity generating element 19 through pumps, but the present invention is not limited to such a structure. For example, the fuel cell system of the present invention alternatively may include a structure in which a fuel and an oxidant are provided in a diffusion manner.

Referring to FIG. 3, the fuel cell system 100 includes a stack 7 composed of at least one electricity generating element 19 which generates electrical energy through an electrochemical reaction of a fuel and an oxidant, a fuel supplier 3 for supplying a fuel to the electricity generating element 19, and an oxidant supplier 5 for supplying an oxidant to the electricity generating element 19.

In addition, the fuel supplier 3 is equipped with a tank 9, which stores fuel, and a pump 11, which is connected with the tank 9. The fuel pump 11 supplies the fuel stored in the tank 9 to the stack 7.

The oxidant supplier 5, which supplies the electricity generating element 19 with the oxidant, is equipped with at least one pump 13 for supplying the oxidant to the stack 7.

The electricity generating element 19 includes a membrane-electrode assembly 21, which oxidizes the fuel (e.g., hydrogen) and reduces the oxidant, and separators 23 and 25 that are respectively positioned at opposite sides of the membrane-electrode assembly 21 to supply the fuel and the oxidant, respectively.

The following examples illustrate the present invention in more detail. However, it is understood that the present invention is not limited by these examples.

EXAMPLE 1

0.36M of an aniline monomer, 1.0M of a dodecylbenzene sulfonic acid used as an organic acid dopant, and a 3 wt %-polyethyleneoxide (M.W.=5,000,000) polymer were added to 100 g of deionized water used as a solvent to prepare a mixture. A perfluorosulfonate ion exchange resin membrane was positioned in the middle of a 2-compartment diffusion cell as shown in FIG. 1. Then, the above mixture was disposed at one side of the perfluorosulfonate ion exchange resin membrane, and a solution prepared by adding a 5 wt %-$FeCl_3$ oxidant to 100g of acetonitrile as a solvent was disposed at the other side of the membrane. Next, the mixture of the aniline monomer, the organic acid dopant, and the polyethylene oxide, and the oxidant solution, were diffused at 4° C. for 24 hours, and thereby a polymer electrolyte membrane was prepared. The polymer electrolyte includes polyaniline (PANi) and polyethyleneoxide (PEO) prepared from a side of the ion exchange resin membrane to a depth of 5% of the entire thickness of the membrane from the side of the membrane. In addition, the organic acid dopant was doped in the polyaniline.

Then, a slurry was prepared by respectively mixing a 5 wt %-Nafion/$H_2O$/2-propanol solution (Solution Technology Inc., EW1100), dipropylene glycol, and deionized water with Pt-Ru black (referred to as a catalyst not supported in a carrier, Johnson Matthey, HiSpec 6000) and Pt black (Johnson Matthey, HiSpec 1000) particles. The slurry was screen-printed on a tetrafluoroethylene (TEFLON) film and dried to form a catalyst layer. The catalyst layer was then positioned on either side of the prepared polymer electrolyte membrane and hot-pressed with a pressure of 200 kgf/cm$^2$ at 200° C. for 3 minutes to form a cathode and an anode with respective loading of 4 mg/cm$^2$.

Then, a diffusion layer (ELAT of E-Tek Co.) was positioned to contact each of the cathode and the anode separated by the polymer electrolyte membrane to fabricate a membrane-electrode assembly.

The membrane-electrode assembly was interposed between a gasket and glass fiber coated with polytetrafluoroethylene, then interposed between two separators equipped with a gas flow channel and a cold channel having a shape that may be predetermined, and then compressed between gold-plated copper-end plates to prepare a single fuel cell.

EXAMPLE 2

A single cell was prepared in substantially the same method as in Example 1, except that a polyvinylalcohol (M.W.=100,000) polymerpolyethyleneoxide was used instead of a polyvinylalcohol (M.W.=100,000) polymer.

EXAMPLE 3

A mixture was prepared by adding 0.36M of an aniline monomer and 1.0M of dodecylbenzene sulfonic acid used as an organic acid dopant to 100 g of deionized water used as a solvent. Then, a perfluorosulfonate ion exchange resin membrane was positioned at one side of a 2-compartment diffusion cell as shown in FIG. 1, and a $FeCl_3$ oxidant solution in a 5 wt % concentration formed by using 100 g of acetonitrile as a solvent was positioned at the other side of the 2-compartment diffusion cell. Next, a polymer electrolyte membrane for a fuel cell was prepared. The polymer electrolyte membrane includes polyaniline (PANi) formed on a side of the ion exchange resin membrane to a depth of 5% of the thickness the membrane, by diffusing the mixture of the aniline monomer and the organic acid dopant, and the oxidant solution, at 4° C. for 24 hours.

The electrolyte membrane was then used to prepare a single fuel cell according to Example 1.

COMPARATIVE EXAMPLE 1

A polymer electrolyte membrane was prepared by treating a 125 μm-thick Nafion 115 membrane (E.I. Dupont) respectively in 3%-hydrogen peroxide and 0.5M of a sulfuric acid aqueous solution at 100° C. for an hour, and then washing it in deionized water at 100° C. for an hour. The properties of this membrane were then evaluated in substantially the same manner as Example 1.

Figure 4:
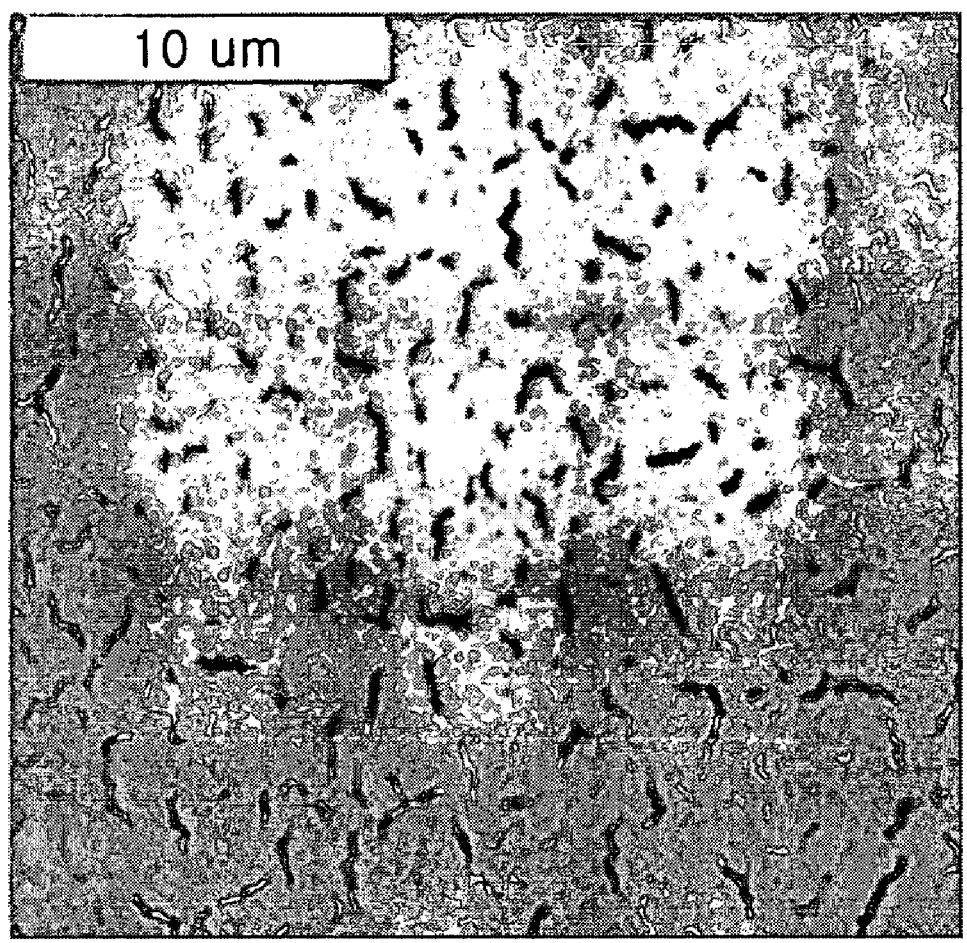
FIG. 4 is a SEM photograph of a polymer electrolyte membrane according to Example 2.
Figure 5:
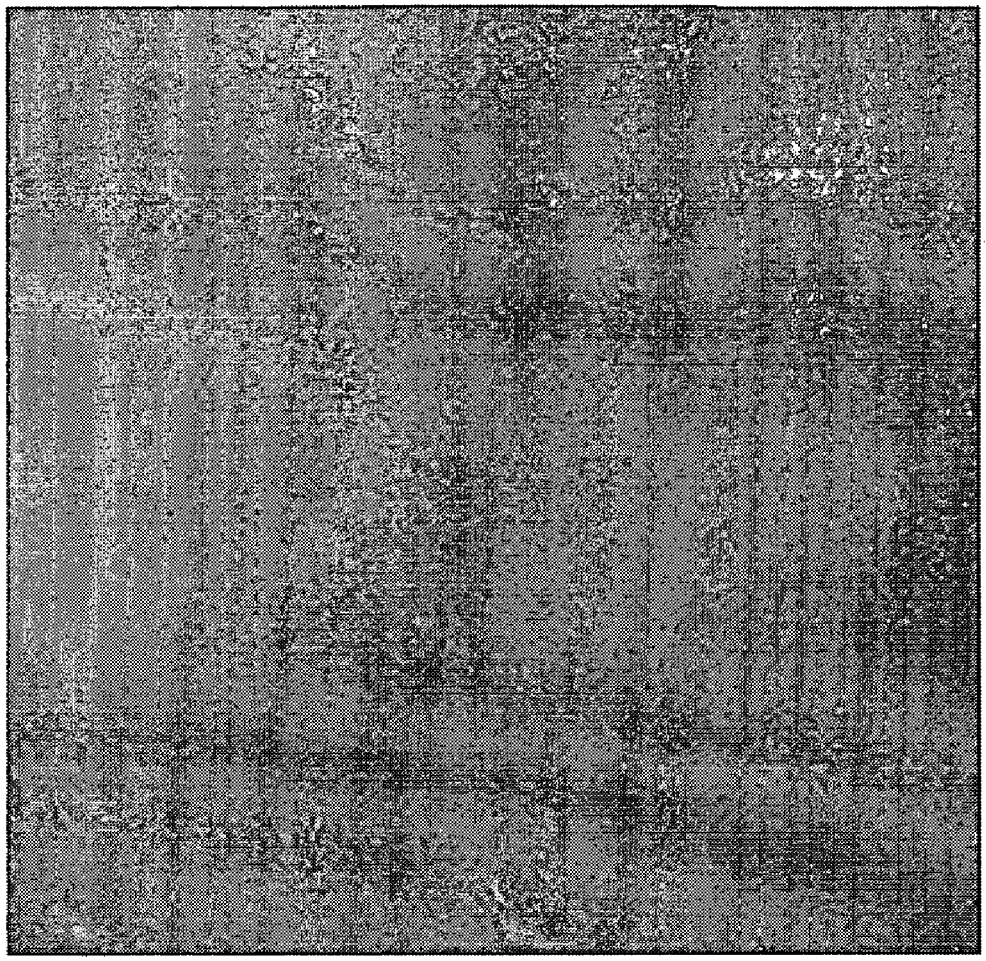
FIG. 5 is a SEM photograph of a polymer electrolyte membrane according to Comparative Example 1.

FIG. 4 shows a SEM photograph with a magnification of 3,000 times of a surface of a polymer electrolyte membrane prepared according to Example 2. FIG. 5 shows a SEM photograph with a magnification of 3,000 times a polymer electrolyte membrane prepared according to Comparative Example 1. The surface photograph shown in FIG. 4 is different from that of FIG. 5, because the polymer electrolyte membrane prepared according to Example 2 has a mixture of polyaniline and polyvinylalcohol on its surface.

Figure 6:
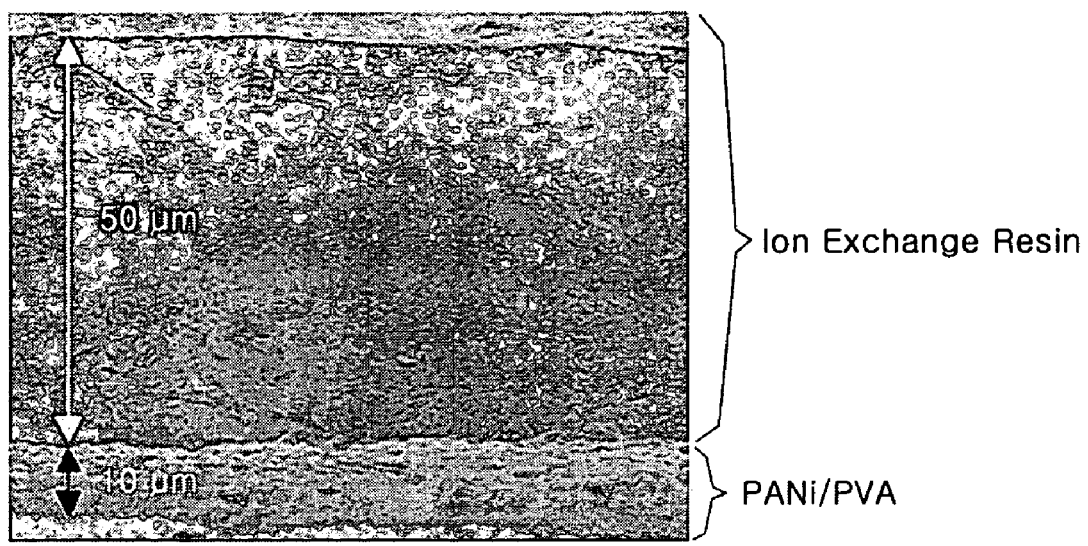
FIG. 6 is a SEM photograph showing a cross section of the polymer electrolyte membrane according to Example 2.

In addition, FIG. 6 shows a cross-sectional SEM photograph of the polymer electrolyte membrane prepared according to Example 2. Referring to FIG. 6, the mixture of polyaniline and polyvinylalcohol is formed to a depth of up to one sixth of the thickness of the ion exchange resin membrane within 72 hours of starting the diffusion reaction.

Figure 7:
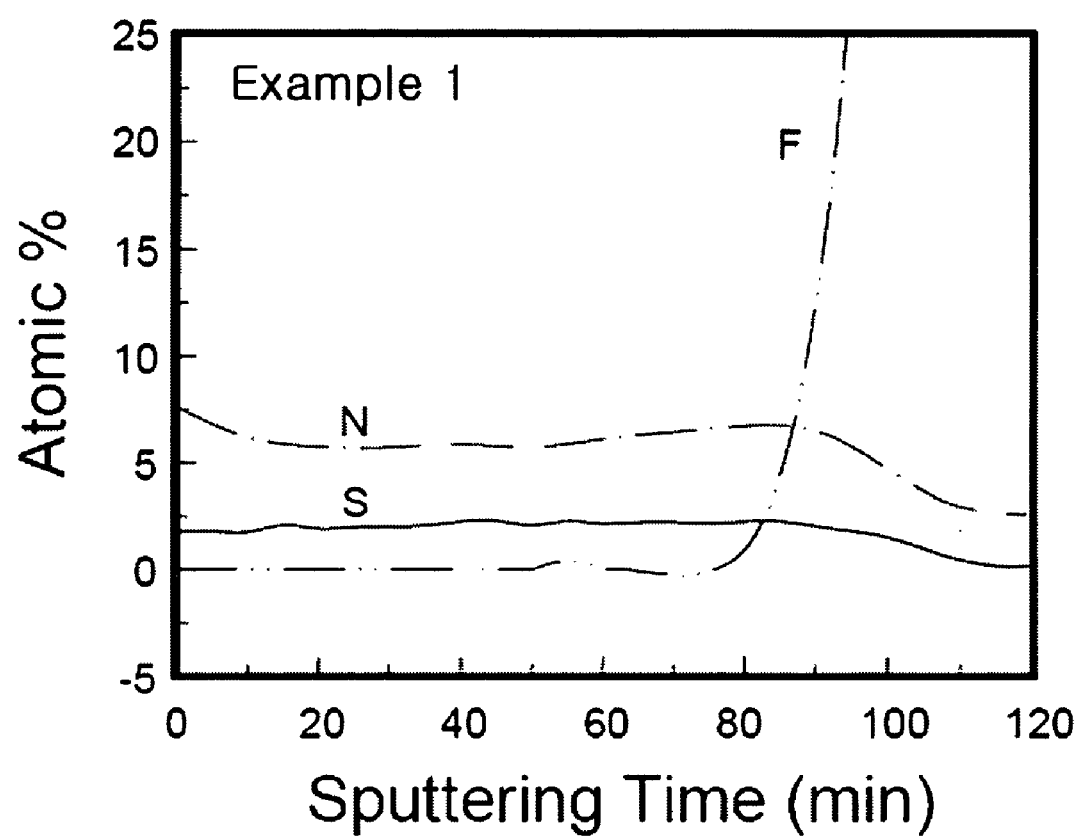
FIG. 7 is a graph showing surface analysis result of a polymer electrolyte membrane according to Example 1 of the present invention using an Auger Electron Spectroscopy.

FIG. 7 is a graph showing surface analysis result of the polymer electrolyte membrane according to Example 1 of the present invention using an Auger Electron Spectroscopy. As a result of elemental analysis while sputtering at a rate of 1000 Angstrom/min, N and S elements were detected at a membrane surface and F was detected at a certain depth of the membrane. These results indicate that aniline and dodecylbenzene sulfonic acid are present at the surface of the perfluorosulfonate membrane.

Ion conductivities of the electrolyte membranes according to Examples 1 and 2 and Comparative Example 1 was measured as follows. The membranes were placed in a measurement cell from BekkTech Company. Conductivity was measured in accordance with alternating current impedance under controlled relative humidity and a frequency ranging from 100 Hz to 1 MHz, and at 10 mV of perturbation voltage with an inflow of humidified hydrogen into the electrolyte membrane.

Methanol permeability of the electrolyte membrane according to the membranes Example 1, 2 and Comparative Example 1 was measured as follows: an electrolyte membrane sample was positioned in a two-compartment discharge cell, and 15 wt % methanol/deionized water mixture and deionized water were respectively circulated in the two-compartment discharge cell. Then, the concentration of methanol that had permeated through the electrolyte membrane was measured by a change in the refractive index.

Figure 8:
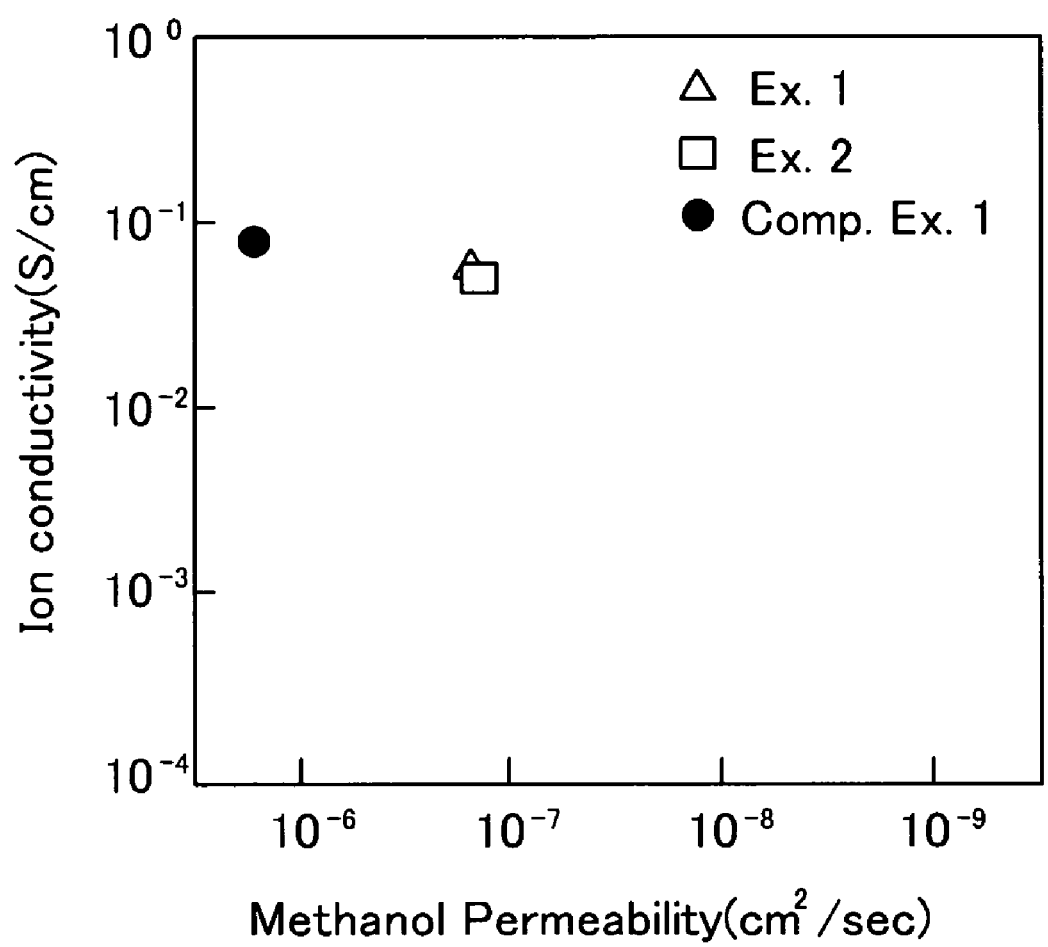
FIG. 8 is a graph showing ion conductivity and methanol permeability of the polymer electrolyte membranes according to Examples 1 and 2 of the present invention and Comparative Example 1.

FIG. 8 shows the results of measuring ion conductivity and methanol permeability of the polymer electrolyte membranes prepared according to Examples 1 and 2 and Comparative Example 1. As shown in FIG. 8, the polymer electrolyte membranes of Examples 1 and 2 maintained high conductivity, and also revealed methanol barrier characteristics that are higher than Comparative Example 1.

Figure 9:
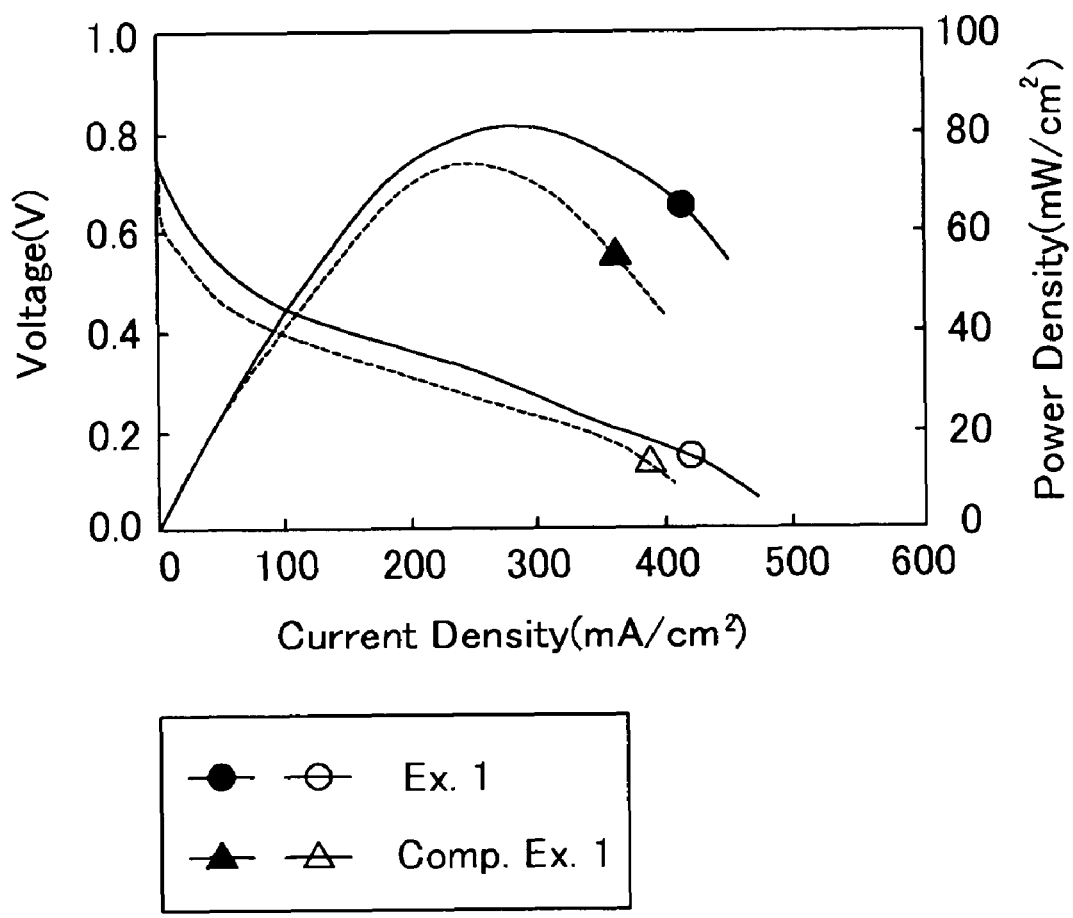
FIG. 9 is a graph showing power output characteristics of fuel cells according to Example 1 and Comparative Example 1.

The single cell of Example 1 and the single cell of Comparative Example 1 were measured with reference to their current density and power output density at 50° C. by inflowing 1M of methanol and dry air into the cell, and the measurements are provided in FIG. 9. As shown in FIG. 9, since the polymer electrolyte membrane of Example 1 has high ion conductivity and good methanol barrier characteristics, the fuel cell of Example 1 has a higher current density than that of Comparative Example 1 at the same voltage and has a 10%-improved power output density, as compared with that of Comparative Example 1.

Therefore, a polymer electrolyte membrane for a fuel cell of an embodiment of the present invention can reduce or prevent a hydrocarbon fuel such as methanol from crossing over to provide a fuel cell with improved power output characteristics.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A polymer electrolyte membrane for a fuel cell, the polymer electrolyte membrane comprising:
   an ion exchange resin membrane; and
   a composition of an electric conductive polymer and another polymer,
   wherein the composition of the electric conductive polymer and the other polymer is present from one side of the ion exchange resin membrane to the interior of the ion exchange resin membrane, and
   wherein the electric conductive polymer and the other polymer coexist in a weight ratio of 7/3 to 5/5.

2. The polymer electrolyte membrane of claim 1, wherein, from the one side of the ion exchange resin membrane, the electric conductive polymer is present up to about 20% of the thickness of the ion exchange resin membrane.

3. The polymer electrolyte membrane of claim 1, wherein, from the one side of the ion exchange resin membrane, the electric conductive polymer is present up to from about 2 to 10% of the thickness of the ion exchange resin membrane.

4. The polymer electrolyte membrane of claim 1, wherein the electric conductive polymer comprises a material selected from the group consisting of polyaniline, polypyrrole, polyacetylene, polyacene, polythiophene, polyalkylthiophene, poly(p-phenylene), polyphenylene, polyphenylene sulfide, polyphenylenevinylene, and polyfuran.

5. The polymer electrolyte membrane of claim 1, wherein the composition of the electric conductive polymer and the other polymer comprises a dopant.

6. The polymer electrolyte membrane of claim 5, wherein the dopant comprises a material selected from the group consisting of sulfuric acid, phosphoric acid, camphorsulfonic acid, benzenesulfonic acid, sodium benzenesulfonate, alkylbenzenesulfonic acid, alkylsodium benzenesulfonate, and mixtures thereof.

7. The polymer electrolyte membrane of claim 1, wherein the ion exchange resin membrane comprises a polymer resin containing a cation exchange group at its side chain, and wherein the cation exchange group is selected from the group consisting of a sulfonic acid group, a carboxylic acid group, a phosphoric acid group, a phosphonic acid group, and derivatives thereof.

8. The polymer electrolyte membrane of claim 7, wherein the polymer resin comprises a material selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers.

9. A polymer electrolyte membrane for a fuel cell, the polymer electrolyte membrane comprising:
   an ion exchange resin membrane; and
   an electric conductive polymer,
   wherein the electric conductive polymer is present from one side of the ion exchange resin membrane to the interior of the ion exchange resin membrane,
   wherein the electric conductive polymer comprises a dopant, and
   wherein the dopant is selected from alkylbenzenesulfonic acid, alkylsodium benzenesulfonate, and mixtures thereof, and wherein the alkyl group has from 1 to 12 carbons.

10. A polymer electrolyte membrane for a fuel cell, the polymer electrolyte membrane comprising:
    an ion exchange resin membrane; and
    an electric conductive polymer,
    wherein the electric conductive polymer is present from one side of the ion exchange resin membrane to the interior of the ion exchange resin membrane,
    wherein the electric conductive polymer comprises a dopant, and
    wherein the dopant is selected from alkylbenzenesulfonic acid, alkylsodium benzenesulfonate, and mixtures thereof, and wherein the alkyl group has from 8 to 12 carbons.

11. A fuel cell system comprising:
    an electricity generation unit adapted to produce electrical energy through an oxidation of a fuel and a reduction of an oxidant, the electricity generation unit comprising:
       at least one membrane-electrode assembly comprising a polymer electrolyte membrane interposed between a cathode and an anode, the polymer electrolyte membrane comprising:
          an ion exchange resin membrane, and
          a composition of an electric conductive polymer and another polymer,
          wherein the composition of the electric conductive polymer and the other polymer is present from one side of the ion exchange resin membrane to the interior of the ion exchange resin membrane,
          wherein the electric conductive polymer and the other polymer coexist in a weight ration of 7/3 to 5/5, and
          wherein the one side of the ion exchange resin membrane contacts the anode, and
       a separator arranged on each side of the membrane-electrode assembly;
    a fuel supplier adapted to supply the fuel to the electricity generation unit; and
    an oxidant supplier adapted to supply the oxidant to the electricity generation unit.

12. The fuel cell system of claim 11, wherein, from the one side of the ion exchange resin membrane, the electric conductive polymer is present up to about 20% of the thickness of the ion exchange resin membrane.

13. The fuel cell system of claim 11, wherein, from the one side of the ion exchange resin membrane, the electric conductive polymer is present up to from about 2 to 10% of the thickness of the ion exchange resin membrane.

14. The fuel cell system of claim 11, wherein the electric conductive polymer comprises a material selected from the group consisting of polyaniline, polypyrrole, polyacetylene, polyacene, polythiophene, polyalkylthiophene, poly(p-phenylene), polyphenylene, polyphenylene sulfide, polyphenylenevinylene, and polyfuran.

15. The fuel cell system of claim 11, wherein the ion exchange resin membrane comprises a polymer resin containing a cation exchange group at its side chain, and wherein the cation exchange group is selected from the group consisting of a sulfonic acid group, a carboxylic acid group, a phosphoric acid group, a phosphoric acid group, and derivatives thereof.

16. The fuel cell system of claim 15, wherein the polymer resin comprises a material selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers.

17. The fuel cell system of claim 11, wherein the electric conductive polymer comprises a dopant.

18. The fuel cell system of claim 17, wherein the dopant comprises a material selected from the group consisting of sulfuric acid, phosphoric acid, camphorsulfonic acid, benzenesulfonic acid, sodium benzenesulfonate, alkylbenzenesulfonic acid, alkylsodium benzenesulfonate, and mixtures thereof.

* * * * *

UNITED STATES PATENT AND TRADEMARK OFFICE
CERTIFICATE OF CORRECTION

PATENT NO. : 7,867,667 B2
APPLICATION NO. : 11/478397
DATED : January 11, 2011
INVENTOR(S) : Min-Kyu Song It is certified that error appears in the above-identified patent and that said Letters Patent is hereby corrected as shown below:

| | |
|---|---|
| Column 10, Claim 15, line 58 | Delete "a phosphoric acid group"<br>Insert -- a phosphonic acid group -- |
| Column 11, Claim 17, line 6 | After "wherein the"<br>Insert -- composition of the -- |
| Column 11, Claim 17, line 7 | After "conductive polymer"<br>Insert -- and the other polymer -- |
| Column 12, Claim 18, line 5 | Delete "acid,alkylsodium"<br>Insert -- acid, alkylsodium -- |

Signed and Sealed this
Thirty-first Day of January, 2012

David J. Kappos
*Director of the United States Patent and Trademark Office*